(12) United States Patent
Chen et al.

(10) Patent No.: US 6,903,369 B2
(45) Date of Patent: Jun. 7, 2005

(54) LIQUID CRYSTAL DISPLAY PANEL

(75) Inventors: Ching-Lung Chen, Taichung (TW); Jun-Chang Chen, Taichung (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 171 days.

(21) Appl. No.: 10/604,250

(22) Filed: Jul. 4, 2003

(65) Prior Publication Data

US 2004/0201020 A1 Oct. 14, 2004

(30) Foreign Application Priority Data

Apr. 11, 2003 (TW) ........................................ 92108336 A

(51) Int. Cl.[7] ........................ H01L 29/04; G02F 1/1345

(52) U.S. Cl. ........................ 257/59; 257/72; 349/149; 349/150; 349/151; 349/152

(58) Field of Search ..................... 257/59, 72; 349/149, 349/150, 151, 152, 129; 324/770

(56) References Cited

U.S. PATENT DOCUMENTS 6,750,926 B2 * 6/2004 Ohgiichi et al. .............. 349/40

* cited by examiner

Primary Examiner—David Nelms
Assistant Examiner—Long Tran
(74) Attorney, Agent, or Firm—Jianq Chyun IP Office

(57) ABSTRACT

A liquid crystal display panel having a display region and a non-display region is provided. The non-display region of the liquid crystal panel comprises a plurality of driver chip joining regions and a plurality of flexible printed circuit bonding regions. There are several groups of circuit lines connecting various driver chip joining regions and flexible printed circuit bonding regions. The ends of the circuit lines connected to the driver chip joining region are the input terminals. Furthermore, each group of circuit lines has a plurality of sub-lines for controlling the pixels of different colors. Among the sub-lines of neighboring circuit lines, the sub-lines at the input terminal for controlling identical color pixels are set up in pairs adjacent to each other. Hence, the resistance-capacitance loading of the liquid crystal display panel is raised and the image quality is improved without incurring greater manpower or manufacturing cost.

16 Claims, 3 Drawing Sheets

LIQUID CRYSTAL DISPLAY PANEL

CROSS REFERENCE TO RELATED APPLICATIONS

This application claims the priority benefit of Taiwan application Serial No. 92108336, filed on Apr. 11, 2003.

BACKGROUND OF INVENTION

1. Field of Invention

The present invention relates to a liquid crystal display panel. More particularly, the present invention relates to a liquid crystal display panel with a higher resistance-capacitance (RC) loading.

2. Description of Related Art

An outcome of the rapid progress in high-tech products is the popularity of video products such as digital video or imaging devices in our daily life. To be useful, these digital video and imaging devices must provide a high-quality display so that a user can operate a controlling device after reading some important information disseminated from the display.

To match the life style of modern people, video or imaging equipment is becoming lighter and slimmer. Although the conventional cathode ray tube (CRT) has many advantages, the design of the electron gun renders it heavy and bulky. Moreover, power consumption of a CRT is relatively high and there is always some health concern due to possible radiation. With big leaps in the techniques in manufacturing semiconductor devices and opto-electronic devices, flat panel displays such as liquid crystal displays (LCD) have been developed. Since liquid crystal displays are light and capable of operating at a low voltage without producing any radiation, LCD and other flat panel displays including the plasma displays and the electroluminance displays have gradually become mainstream display products.

Typically, a liquid crystal display panel consists of a display region and a non-display region. The non-display region furthermore comprises a plurality of driver chip joining regions and a plurality of flexible printed circuit bonding regions.

FIG. 1 is a diagram showing the circuit layout between the flexible printed circuit bonding region and the driver chip joining region of a conventional liquid crystal display panel. As shown in FIG. 1, the total length of various connection lines 110 linking between the driver chip joining region 100 and the flexible printed circuit bonding region 120 for transmitting external signals to the display region increases progressively. Furthermore, when the circuit lines 110 also functions as circuits for performing an electrostatic discharge (ESD), the area between the driver chip joining region 100 and the flexible printed circuit bonding region 120 has a double-layered circuit layout.

However, a timing signal is always required to control a display such as the low temperature polysilicon (LTPS) liquid crystal display regardless of whether a pre-charge circuit, a horizontal driver circuit or a vertical driver circuit is deployed. Hence, the resistance-capacitance (RC) wiring on the liquid crystal display panel preferably has an identical layout.

Yet, as shown in FIG. 1, no matter what the sub-lines for controlling the display of red (R), green (G) or blue (B) in a conventional liquid crystal display are ordered, the total length of the circuit lines always increases incrementally. Thus, the difference in vertical length of the sub-lines for controlling the same color pixels (for example, the two sub-lines labeled R) is three times the difference in vertical length between neighboring sub-lines. Hence, all circuit lines currently have intrinsic resistance-capacitance (RC) delay problems. Although special software can be used to correct such wiring problem automatically, these programs are generally costly to procure. On the other hand, if one tries to solve the wiring problem through hard labor, the process may take quite some time.

SUMMARY OF INVENTION

Accordingly, one object of the present invention is to provide a liquid crystal display panel capable of raising resistance-capacitance loading and hence enhancing image quality without increasing production or labor cost.

To achieve these and other advantages and in accordance with the purpose of the invention, as embodied and broadly described herein, the invention provides a liquid crystal display panel. The liquid crystal display panel has a display region and a non-display region. The non-display region comprises a plurality of driver chip joining regions and a plurality of flexible printed circuit bonding regions. There are several groups of circuit lines connecting various driver chip joining regions and flexible printed circuit bonding regions. The ends of the circuit lines connected to the driver chip joining region are the input terminals. Furthermore, each group of circuit lines has a plurality of sub-lines for controlling pixels of different colors. Among the sub-lines of neighboring circuit lines, the sub-lines at the input terminal for controlling identical color pixels are set up in pairs adjacent to each other.

This invention also provides an alternative liquid crystal display panel. The liquid crystal display panel comprises a first array substrate, a second array substrate and a liquid crystal layer. The first array substrate has a display region and a non-display region. The non-display region furthermore comprises a plurality of driver chip joining regions, a plurality of flexible printed circuit bonding regions and several groups of circuit lines that connect various driver chip joining regions and printed circuit bonding regions together electrically. The ends of circuit lines connected to the driver chip joining region are the input terminals. Furthermore, each group of circuit lines has a plurality of sub-lines for controlling pixels of different colors. Among the sub-lines of neighboring circuit lines, the sub-lines at the input terminal for controlling identical color pixels are set up in pairs adjacent to each other. The second array substrate is set up over the display region of the first array substrate. The liquid crystal layer is sandwiched between the first array substrate and the second array substrate.

In this invention, a circuit layout having a lower difference in wiring length between the circuit lines linking up a driver chip joining region with a printed circuit bonding region is used. Hence, the resistance-capacitance loading of the liquid crystal display panel is raised and the image quality is improved without incurring greater manpower or manufacturing cost.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
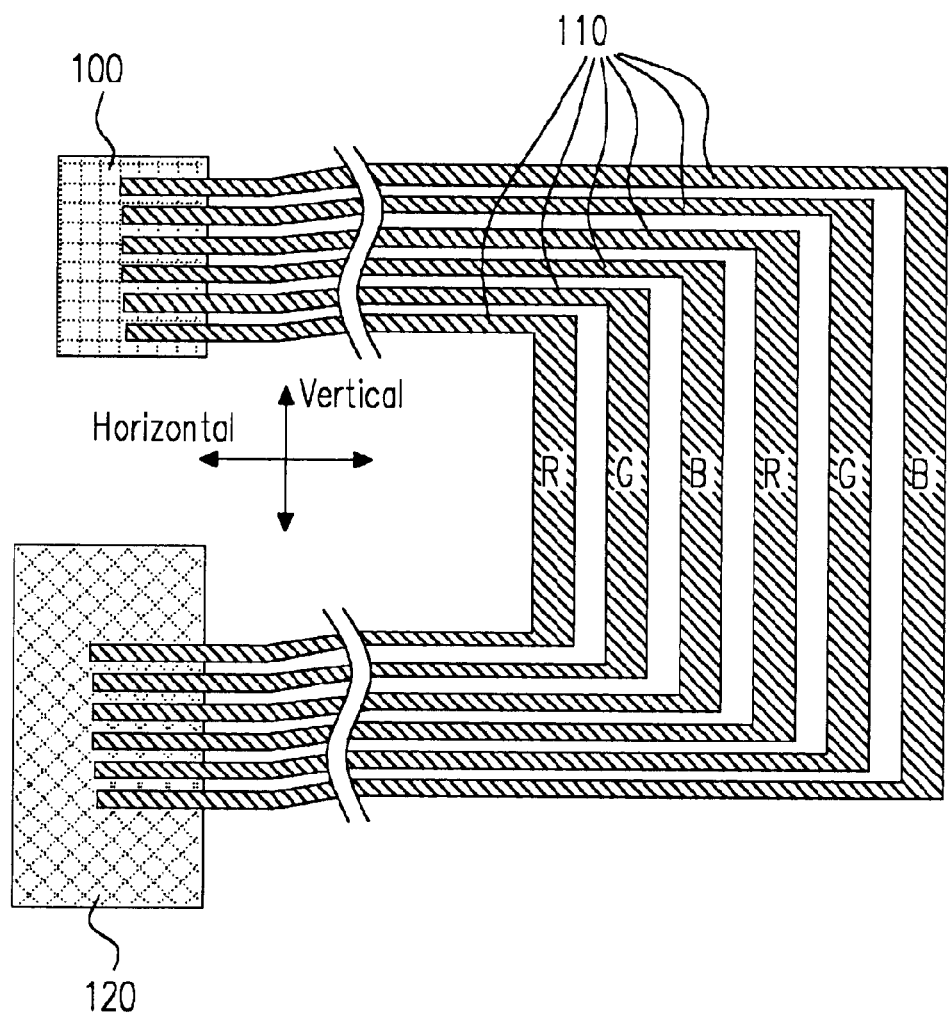
FIG. 1 is a diagram showing the circuit layout between the flexible printed circuit bonding region and the driver chip joining region of a conventional liquid crystal display panel.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
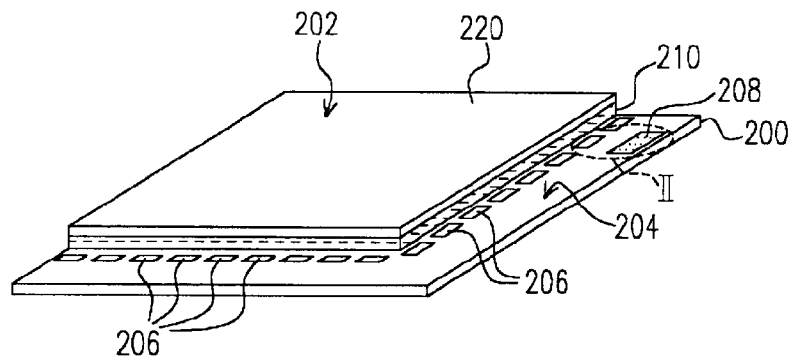
FIG. 2A is a perspective view of a liquid crystal display panel according to this invention.

FIG. 2A is a perspective view of a liquid crystal display panel according to this invention. As shown in FIG. 2A, the liquid crystal display panel comprises a first array substrate 200, a second array substrate 220 and a liquid crystal layer 210. The first array substrate 200 is an active device array substrate or a passive device array substrate. If the first array substrate 200 is an active device array substrate, the first array substrate 200 can be a thin film transistor array substrate and the second array substrate 220 can be a color-filtering substrate. The first array substrate 200 furthermore comprises a display region 202 and a non-display region 204. The non-display region 204 has a plurality of driver chip joining regions 206 and a plurality of flexible printed circuit bonding region 208. The driver chip joining region 206 connects with circuit lines (not shown) that extend from within the display region 202 including, for example, scan lines or data lines. The flexible printed circuit bonding region 208 collects some of the circuit lines (not shown) emerging from the driver chip joining region 206 so that the flexible printed circuit bonding region 208 is connected to a flexible printed circuit film for receiving signals. Although 17 driver chip joining regions 206 and 1 flexible printed circuit bonding region 208 are shown in FIG. 1A, the number of driver chip joining regions 206 and the number of flexible printed circuit bonding region 208 that can be designed on the non-display region 204 are variables.

The second array substrate 220 is positioned over the display region 202 of the first array substrate 200. The liquid crystal layer 210 is sandwiched between the first array substrate 200 and the second array substrate 220. In addition, the driver chip joining region 206 furthermore includes a plurality of driver chips (not shown) for driving the liquid crystal layer 210 within the display region 202. The driver chips may include a scanning chip and a data chip, for example. One major aspect of this invention is found in the circuit layout between the driver chip joining region 206 and the flexible printed circuit bonding region 208.

Figure 2B:
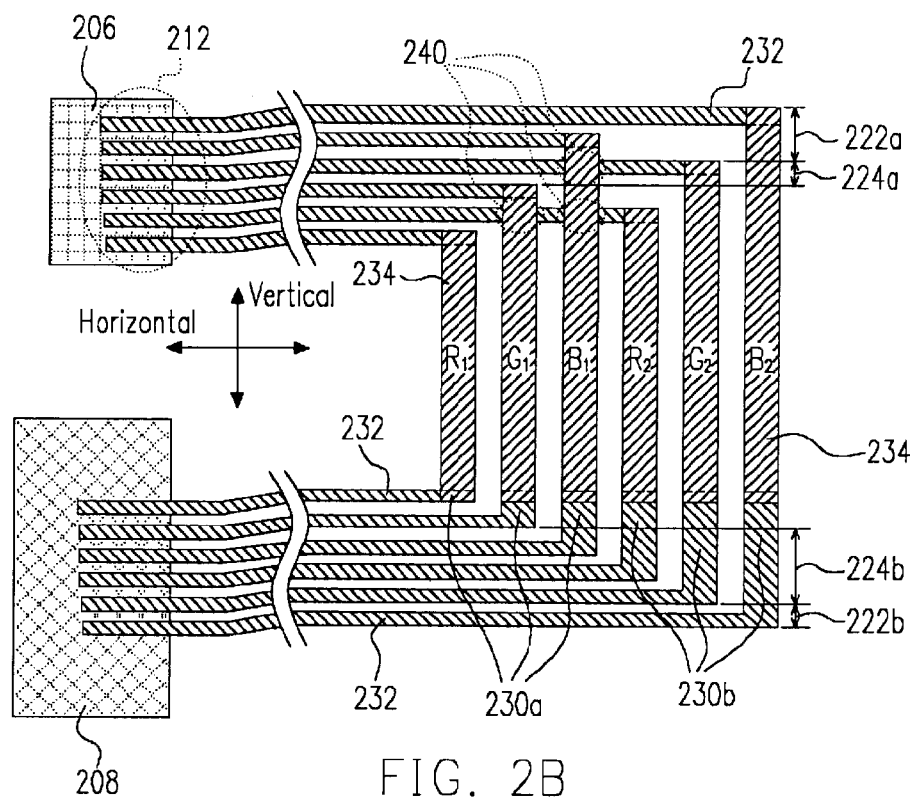
FIGS. 2B is a magnified view of the section 11 in FIG. 2A showing the layout between the flexible printed circuit bonding region and the driver chip joining region according to a first embodiment of this invention.

FIGS. 2B is a magnified view of the section 11 in FIG. 2A showing the layout between the flexible printed circuit bonding region and the driver chip joining region according to a first embodiment of this invention. As shown in FIG. 2B, the driver chip joining region 206 and the flexible printed circuit bonding region 208 are electrically connected through two groups of circuit lines 230a and 230b. The ends of the group of circuit lines 230a and 230b connected to the driver chip joining region 206 are the input terminals 212. The first group of circuit lines 230a has three sub-lines that control the display of red $R_1$, green $G_1$ and blue $B_1$ pixels respectively. Similarly, the second group of circuit lines 230b has three sub-lines that control the display of red $R_2$, green $G_2$ and blue $B_2$ pixels respectively. However, the input terminals 212 of the sub-lines in each group of circuit lines 230a, 230b controlling the same color pixels are positioned in pairs adjacent to each other. As shown in FIG. 2B, the sub-lines for controlling the red pixels $R_1$, $R_2$ are adjacent, the sub-lines for controlling the green pixels $G_1$, $G_2$ are adjacent and the sub-lines for controlling the blue pixels $B_1$, $B_2$ are adjacent at the input end. According to the layout of the group of circuit lines 230a, 230b in this invention, if each sub-line is separated from each other by the same distance, the difference in vertical lengths 222a, 222b between the sub-lines for controlling the green pixels $G_1$, $G_2$ is 1~2 times the difference in vertical lengths 224a, 224b for the sub-lines controlling the green $G_2$ and the blue $B_2$ pixels. Hence, the overall difference in length is smaller than the conventional layout. Although the vertical length of the three sub-lines in each group of circuit lines (230a, 230b) for controlling the red, green and blue pixels increases incrementally, this layout serves as an illustration and should by no means restrict the scope of this invention. It is also possible to design the three sub-lines for controlling the red, green and blue pixels such that the vertical length of the three sub-lines decreases incrementally. Moreover, the total number of groups of lines is not limited to the two groups 230a and 230b as shown in FIG. 2B.

The circuit lines 230a, 230b are actually formed on two different layers including a first circuit layer 232 and a second circuit layer 234. Hence, there are some overlapping areas 240 between some of the circuit lines. These overlapping areas 240 are the source of some capacitance between various groups of circuit lines 230a, 230b. The capacitance in these overlapping regions 240 has some advantages. When the liquid crystal display panel is in operation, there is a delay in the signal sent out from a driver to the display region 202 due to a difference in the overall length of the circuit lines. In the presence of the overlapping regions 240, however, such delay in signal transmission is greatly minimized.

Furthermore, various groups of circuit lines 230a, 230b can be fabricated together with the liquid crystal display so that some production time is saved. For example, the first circuit layer 232 and the first metallic layer (Metal 1) of the liquid crystal display can be fabricated together and the second circuit layer 234 and the second metallic layer (Metal 2) of the liquid crystal display can be fabricated together. In addition, the dielectric layer (not shown) between the first and the second circuit layer 232, 234 and the contact opening (not shown) for connecting the first and the second circuit layers 232, 234 electrically can be fabricated together with the gate insulation layer of the liquid crystal display.

Figure 2C:
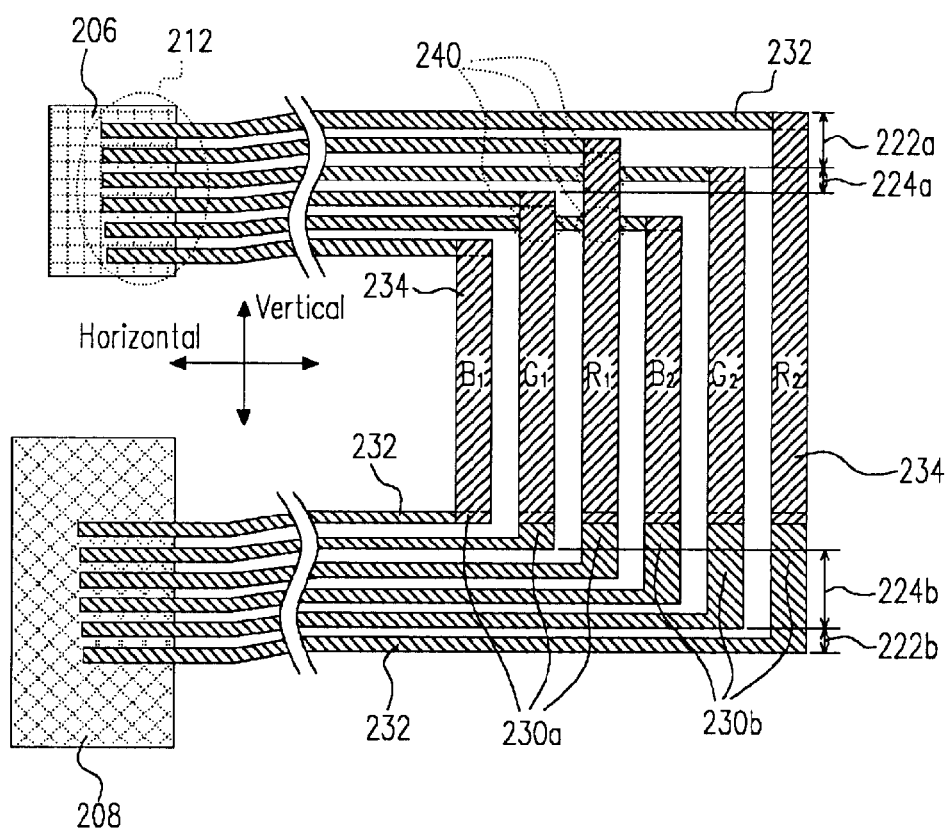
FIGS. 2C is a magnified view of the section 11 in FIG. 2A showing the layout between the flexible printed circuit bonding region and the driver chip joining region according to a second embodiment of this invention.

FIGS. 2C is a magnified view of the section II in FIG. 2A showing the layout between the flexible printed circuit bonding region and the driver chip joining region according to a second embodiment of this invention. As shown in FIG. 2C, the layout is very similar to the one in FIG. 2B. The only difference is that the three sub-lines in the circuit lines 230a and 230b for controlling the red, green and blue pixels are positioned in reverse order. Hence, the vertical length of the sub-lines in the group of circuit lines 230a increases from blue $B_1$ to green $G_1$ to red $R_1$ and the vertical length of the sub-lines in the group of circuit lines 230b increases from blue $B_2$ to green $G_2$ to red $R_2$.

Note that the circuit layout as shown in FIGS. 2B and 2C serves as examples in the illustration only. In fact, any resistance-capacitance delay problem in the liquid crystal display panel can rely on this invention to reduce the difference in vertical length between the circuit lines for controlling same color pixels. This layout is easily implemented by incorporating the wiring into the mask for producing the first metallic layer, the gate insulation layer and the second metallic layer. Ultimately, the difference in wiring length connecting the driver chip joining region 206 with the flexible printed circuit bonding region 208 is greatly reduced. Hence, the resistance-capacitance loading of the liquid crystal display panel is raised and the image quality is improved without setting up of costly programs to equalize wiring length automatically or computing wiring lengths manually.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel having a display region and a non-display region, wherein the non-display region has a plurality of driver chip joining regions and a plurality of flexible printed circuit bonding regions, the liquid crystal display panel includes:
    a plurality of groups of circuit lines connecting the driver chip joining regions and the flexible printed circuit bonding regions electrically together such that the ends of the groups of circuit lines connected to the driver chip joining region are input terminals and each group of circuit lines has a plurality of sub-lines for controlling the pixels of various colors, wherein the sub-lines of the group of circuit lines for controlling pixels of the same color are positioned in pairs adjacent to other pairs at the input terminal.

2. The liquid crystal display panel of claim 1, wherein the vertical length of the sub-lines in each group of circuit lines increases incrementally.

3. The liquid crystal display panel of claim 1, wherein the vertical length of the sub-lines in each group of circuit lines decreases incrementally.

4. The liquid crystal display panel of claim 1, wherein the panel further comprises a plurality of driver chips positioned inside the driver chip joining region for driving the liquid crystal layer over the display region.

5. The liquid crystal display panel of claim 4, wherein the driver chips comprises scanning chips, data chips, or scanning chips and data chips.

6. The liquid crystal display panel of claim 1, wherein the sub-lines are used for controlling a red, a green or a blue pixel.

7. A liquid crystal display panel, comprising:
    a first array substrate, wherein the first array substrate has a display region and a non-display region, wherein the non-display region further comprising:
    a plurality of driver chip joining regions;
    a plurality of flexible printed circuit bonding regions; and
    a plurality of groups of circuit lines connecting various driver chip joining regions and flexible printed circuit bonding regions electrically together such that the ends of the groups of circuit lines connected to the driver chip joining region are input terminals and each group of circuit lines has a plurality of sub-lines for controlling the pixels of various colors, wherein the sub-lines of the group of circuit lines for controlling pixels of the same color are positioned in pairs adjacent to other pairs at the input terminal;
    a second array substrate positioned over the display region of the first array substrate; and
    a liquid crystal layer sandwiched between the first array substrate and the second array substrate.

8. The liquid crystal display panel of claim 7, wherein the vertical length of the sub-lines in each group of circuit lines increases incrementally.

9. The liquid crystal display panel of claim 7, wherein the vertical length of the sub-lines in each group of circuit lines decreases incrementally.

10. The liquid crystal display panel of claim 7, wherein the panel further comprises a plurality of driver chips positioned inside the driver chip joining region for driving the liquid crystal layer over the display region.

11. The liquid crystal display panel of claim 10, wherein the driver chips comprises scanning chips, data chips, or scanning chips and data chips.

12. The liquid crystal display panel of claim 7, wherein the first array substrate comprises an active device array substrate.

13. The liquid crystal display panel of claim 12, wherein the active device array substrate comprises a thin film transistor array substrate.

14. The liquid crystal display panel of claim 7, wherein the first array substrate comprises a passive device array substrate.

15. The liquid crystal display panel of claim 7, wherein the second array substrate comprises a color-filtering plate.

16. The liquid crystal display panel of claim 7, wherein the sub-lines are used for controlling a red, a green or a blue pixel.

* * * * *